(12) United States Patent
Nakamura et al.

(10) Patent No.: US 7,040,298 B2
(45) Date of Patent: May 9, 2006

(54) GROUNDING STRUCTURE OF FUEL TANK

(75) Inventors: Kazuhiro Nakamura, Tochigi (JP); Shinya Murabayashi, Saitama (JP); Hideki Matsumoto, Saitama (JP); Tadahisa Nakamura, Saitama (JP); Naomasa Kaneko, Saitama (JP); Junichi Koseki, Saitama (JP); Daisuke Sato, Saitama (JP); Toshiaki Nakai, Saitama (JP)

(73) Assignees: Yachiyo Industry Co., Ltd., Sayama (JP); Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 10/805,476

(22) Filed: Mar. 22, 2004

(65) Prior Publication Data
US 2004/0231730 A1 Nov. 25, 2004

(30) Foreign Application Priority Data
Mar. 24, 2003 (JP) .............................. 2003-081167

(51) Int. Cl.
*F02M 37/04* (2006.01)

(52) U.S. Cl. ..................................... 123/509; 123/497

(58) Field of Classification Search ................ 123/497, 123/509, 510, 198 D; 137/565.17, 565.37, 137/565.22, 565.01, 565.24, 565.16
See application file for complete search history.

(56) References Cited

U.S. PATENT DOCUMENTS

| 4,651,701 A * | 3/1987 | Weaver ....................... 123/509 |
| 4,869,225 A * | 9/1989 | Nagata et al. ............... 123/509 |
| 5,642,718 A * | 7/1997 | Nakai et al. ................. 123/497 |
| 6,073,614 A * | 6/2000 | Kleppner ..................... 123/509 |
| 6,168,713 B1 * | 1/2001 | Sekine et al. ................ 210/172 |
| 6,206,035 B1 * | 3/2001 | Wehner et al. .......... 137/565.16 |
| 6,453,870 B1 * | 9/2002 | Koller et al. ............ 123/198 E |
| 6,776,185 B1 * | 8/2004 | Farrar et al. ................. 137/560 |
| 2002/0124833 A1 * | 9/2002 | Fauser et al. ............... 123/509 |

FOREIGN PATENT DOCUMENTS

JP     2001-271718     10/2001

\* cited by examiner

*Primary Examiner*—Carl S. Miller
(74) *Attorney, Agent, or Firm*—Armstrong, Kratz, Quintos, Hanson & Brooks, LLP

(57) ABSTRACT

A grounding structure of a fuel tank equipped with a lid body closing an opening of the fuel tank made of resin is characterized by being equipped with a ring-shaped member made of metal fixed on the periphery of the opening, and a retainer made of metal fixing the lid body on the ring-shaped member, wherein an electrically grounded member in the vicinity of the lid body is electrically connected to at least one of the ring-shaped member and retainer, and grounding is performed through at least one of the ring-shaped member and retainer.

15 Claims, 4 Drawing Sheets

GROUNDING STRUCTURE OF FUEL TANK

BACKGROUND OF THE INVENTION

1. Field of the Invention

The present invention relates to a grounding structure of a fuel tank (hereinafter referred to as PFT) made of resin, and in particularly, to a grounding structure of a fuel tank discharging static electricity that is charged on fastening members fixing a lid body that covers an opening of the fuel tank.

2. Description of the Related Art

Conventionally, in a fuel tank made of resin a fuel pump inserted inside the fuel tank is fixed in the fuel tank with being built in an attachment plate. Therefore, in the fuel tank an opening to attach the attachment plate is provided and the attachment plate built in the opening has a structure closing the fuel tank with liquid sealed therein. Static electricity occurring in a fuel tube equipped inside/outside the fuel tank connected to an intank system of fuel pump equipment is designed to be able to be simply discharged without an exclusive a grounding circuit being provided.

FIG. 6 is a section view showing an opening of a fuel tank related to a conventional example and shows an outline of a grounding structure of the fuel tank. As shown in FIG. 6, an upper plate 71 fixed in an opening 62a of a fuel tank 62 and a connector pipe 77 insert-molded in the upper plate 71 are formed of conductive resin, and moreover, a ground terminal 75 of a connector 74 for electrical wiring with contacting the upper plate 71 is insert-molded and fuel tubes 65a and 68a connected to both ends of the connector pipe 77 are formed of the conductive resin. Then due to friction in fuel flowing through the fuel tubes 65a and 68a, static electricity occurring in the connector pipe 77 is discharged outside the fuel tank 62 via the connector pipe 77, upper plate 71, and ground terminal 75 (for example, see pages 2 to 4 and FIG. 3 in Japanese Patent Laid-Open Publication 2001-271718).

However, in these years an improvement of sealing performance of a fuel tank is requested according to environmental regulations and the like. In the future, as the fuel tank it is foreseen that fastening members made of metal such as steel will further increase. Therefore, when the metal such as steel that is large in mass is used for fastening members to close the opening of the fuel tank made of resin, electrical charges due to static electricity are accumulated in a PFT (Plastic Fuel Tank) body and conductive fastening members floated by a seal and packing. That is, the electrical charges charged on the tank main body made of resin flow toward the fastening members made of metal, thereby the charging of the static electricity proceeds, and the members are being charged. Thus, an energy in a case of a conductive material being charged is higher compared with that of an insulator, and an influence in discharging also becomes enormous.

In other words, when the static electricity is accumulated on the fastening members made of metal such as a ring-shaped member and retainer, there exists a problem that: the accumulated static electricity is accumulated as it is since it has no place to escape to; and the electricity is instantly discharged.

SUMMARY OF THE INVENTION

The present invention is performed to solve the problems described above and its exemplary object is to provide a grounding structure of a fuel tank to prevent static electricity from accumulating.

A first aspect of the invention solving the problems is a grounding structure of a fuel tank equipped with a lid body closing an opening of the fuel tank made of resin, and is characterized in that: the grounding structure is equipped with a ring-shaped member made of metal fixed on the periphery of the opening and a retainer made of metal fixing the lid body on the ring-shaped member; wherein an electrically grounded member in the vicinity of the lid body is electrically connected to at least one of the ring-shaped member and retainer, and grounding is performed through at least one of the ring-shaped member and retainer.

The first aspect of the invention enables the accumulation of the static electricity to be prevented with a simple structure even when conductive members (non-creep members) such the ring-shaped member and retainer made of metal that is large in mass are adopted since the grounding structure is equipped with the ring-shaped member made of metal fixed on the periphery of the opening and retainer made of metal fixing the lid body on the ring-shaped member; wherein the electrically grounded member in the vicinity of the lid body is electrically connected to at least one of the ring-shaped member and retainer, and grounding is performed through at least one of the ring-shaped member and retainer.

A second aspect of the invention is, in the first aspect of the invention, characterized in that an outmost layer of the tank main body of the fuel tank is a conductive member and the tank main body is grounded.

The second aspect of the invention enables the accumulation of the static electricity to the conductive members such as the ring-shaped member and retainer made of metal to be prevented since the outmost layer of the tank main body of the fuel tank is the conductive member and thus discharging is also possible from the tank main body.

A third aspect of the invention is, in the first aspect of the invention, characterized in that the electrically grounded member is a grounding member of a fuel pump of the fuel tank housed in the tank main body.

The third aspect of the invention enables the accumulation of the static electricity to be prevented by conductive members such as a lead wire and conductive rubber with a simple structure since the electrically grounded member is the grounding member of the fuel pump housed in the tank main body.

A fourth aspect of the invention is, in the first aspect of the invention, characterized in that the electrically grounded member is at least one of fuel supply piping and fuel return piping of the fuel tank housed in the tank main body.

The fourth aspect of the invention enables the accumulation of the static electricity to be prevented by conductive members such as a lead wire and a conductive rubber with a simple structure since the electrically grounded member is at least one of the fuel supply piping and fuel return piping of the fuel tank housed in the tank main body.

A fifth aspect of the invention is, in the first aspect of the invention, characterized in that the electrically grounded member is a conductive pipe electrically connected to a vehicle body.

The fifth aspect of the invention enables the accumulation of the static electricity to be prevented by conductive members such as a lead wire and a conductive rubber with a simple structure since the electrically grounded member is the conductive pipe electrically connected to the vehicle body A sixth aspect of the invention is, in the second aspect of the invention, characterized in that the electrically grounded member is a conductive pipe electrically connected to a vehicle body.

The sixth aspect of the invention enables the accumulation of the static electricity to be prevented by conductive members such as a lead wire and a conductive rubber with a simple structure since the electrically grounded member is the conductive pipe electrically connected to the vehicle body.

A seventh aspect of the invention is, in any one of the first to sixth aspect of the invention, characterized in that the lid body is conductive.

The seventh aspect of the invention enables a discharge to be performed by the electrically grounded member in the vicinity of the lid body and the accumulation of the static electricity to be prevented with a simple structure since the lid body is conductive.

BRIEF DESCRIPTION OF THE DRAWINGS

FIG. 1A is a perspective view showing an appearance where a lid body is attached; and FIG. 1B is a longitudinal section taken on a line A—A shown in FIG. 1A.

DESCRIPTION OF THE PREFERRED EMBODIMENTS

Figure 1A:
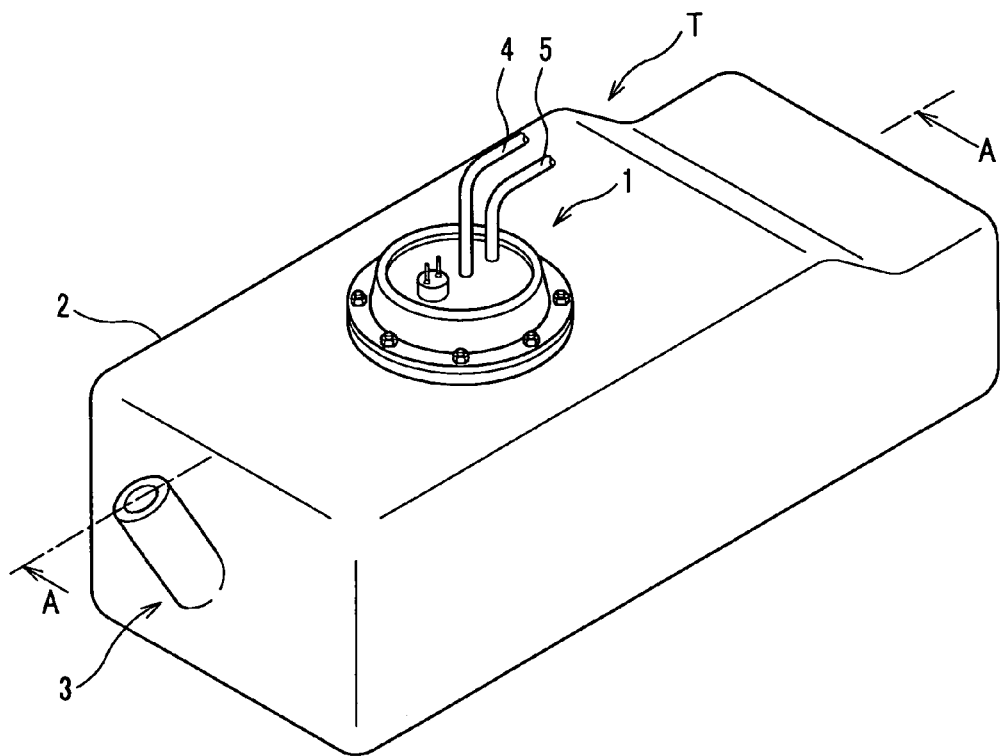
FIGS. 1A and 1B show an outline of a fuel tank where a grounding structure of the fuel tank related to a first embodiment of the present invention is adopted.

Hereinafter, the embodiments of a fuel tank related to the present invention will be described in detail referring to the drawings.

First Embodiment

Figure 1B:
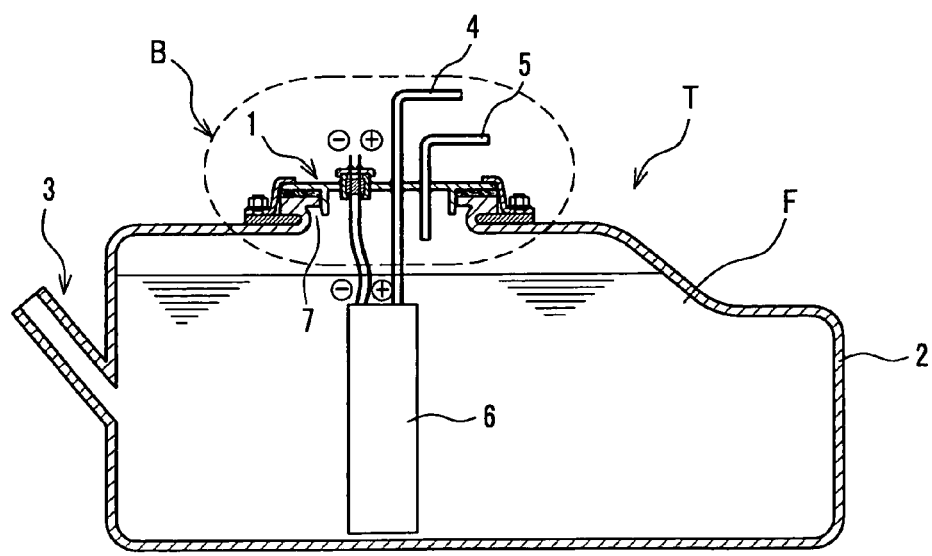

As shown in FIGS. 1A and 1B, a fuel tank T is equipped with a tank main body 2 made of resin reserving a fuel F and an opening 7 opened in the tank main body 2, and a lid body 1 is equipped in the opening 7. In addition, in the tank main body 2 a fuel pump 6 is housed. Therefore, in the lid body 1 are integrally fixed a fuel supply piping 4 supplying the fuel F supplied from the fuel pump 6 to an automobile engine and pump parts such as a fuel return piping 5 through which excessive fuel from the engine flows back. Moreover, in the tank main body 2 is provided a connection port 3 connected to a fuel supply port (omitted from the drawings) opened in the body of the automobile.

Figure 2:
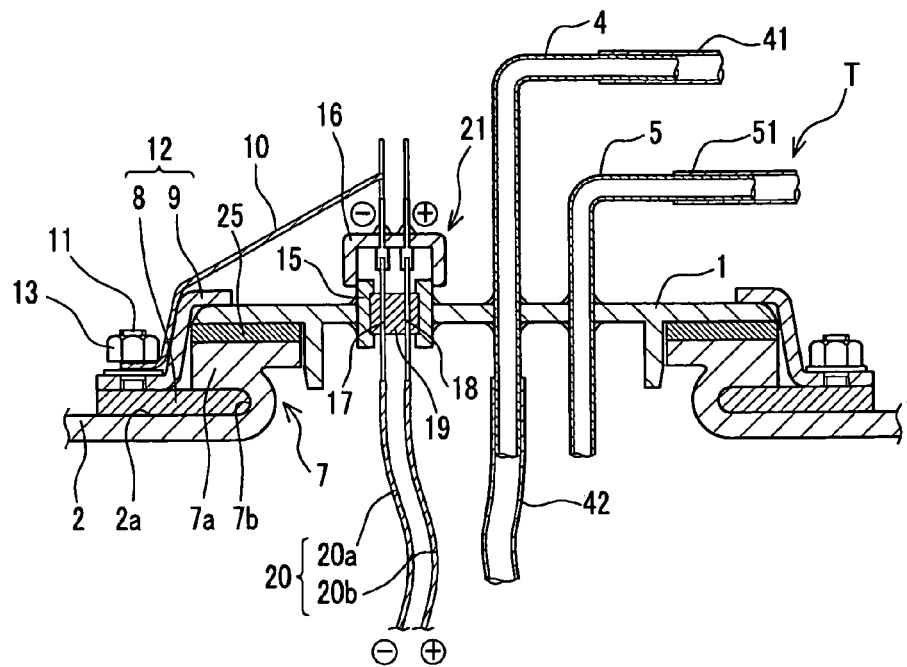
FIG. 2 is an enlarged section view of a portion B shown in FIG. 1B.

As shown in FIG. 2, in the opening 7 that is opened in the tank main body 2 and is circular in a plan view, the disc lid body 1 is covered through a packing 25 and fixed on the tank main body 2 with a retainer 9.

In the opening 7 a flange 7a is formed, and in the periphery of the opening 7 are provided a lower surface of the flange 7a, an outer wall surface 7b of the opening continuing into the lower surface of the flange 7a, and moreover, a ring-shaped member 8 made of metal embedded by the tank main body 2 and a tank outer wall surface 2a.

In the lid body 1, other than the fuel supply piping 4 and fuel return piping 5, a lead wire 20a of a minus side (ground wire) and a lead wire 20b of a plus side led from the fuel pump 6 (see FIG. 1B) are fixed by a connector 21.

The fuel supply piping 4 and fuel return piping 5 penetrate the lid body 1 and are fixed unified with the lid body 1. In addition, one end of the fuel supply piping 4 is connected to the fuel pump 6 through a tube 42; and the other end is connected to an engine side through a pipe 41. Moreover, one end of the fuel return piping 5 is opened inside the tank main body 2; and the other end is connected to the engine side through a pipe 51.

The connector 21 is equipped with a case 15, cap 16, electrode 17 (minus terminal), electrode 18 (plus terminal), and insulator 19; is insulated from the electrodes 17 and 18 by the insulator 19; and integrally fixed in the lid body 1.

The retainer 9 abuts the flange 7a through the packing 25, thus covers the lid body 1 closing the opening 7 from outside, and is screwed in the ring-shaped member 8 with a stud bolt 11 and nut 13. In addition, in order to improve sealing performance, the retainer 9 is formed of metal such as steel that is small in a size change for an environment.

The stud bolt 11 is connected to one end of a lead wire 10 and fixed with the nut 13. In addition, the connector 21 is fixed in the lid body 1, is equipped with the insulator 19 covered with the case 15, and the electrodes 17 and 18 are inserted through the insulator 19 with a distance. The electrode 17 is connected to the other end of the lead wire 10. Thus the ring-shaped member 8 and retainer 9 are electrically conducted to the ground wire 20a of the fuel pump 6 (see FIG. 1B), thereby resulting in being grounded.

The packing 25 is equipped on a circumference between the lower surface of the outer rim portion of the lid body 1 and the upper surface of the opening 7 so as to seal the spacing of the lid body 1 and opening 7.

Next, a grounding structure of the fuel tank T equipped with the above mentioned configuration will be described. As shown in FIG. 1B, the fuel tank T is reserved with the fuel F, and since a vehicle (omitted from the drawing) where the fuel tank T is mounted performs a start, stop, and turn during driving, the fuel F within the tank T results in being swung while waving. Then the tank main body 2 and fuel F have friction, and by the friction, electrical charges occur and some static electricity is charged on a resin surface of the tank main body 2. Then as shown in FIG. 2, on the circumference of the opening 7 is provided a fastening member 12 made of metal fastening the lid body 1 to the tank main body 2 in order to improve the sealing performance of the fuel tank T. Therefore, the electrical charges charged on the resin surface of the tank main body 2 move to the fastening member 12, thereby static electricity resulting in being accumulated on the fastening member 12 made of metal.

The embodiment enables the static electricity accumulated on the fastening member 12 to be grounded through the electrode 17 of the minus side of the fuel pump 6 (see FIG. 1B) by connecting the fastening member 12 to the electrode 17 of the minus side of the pump 6 through the lead wire 10. In addition, if the lead wire is electrically conductive, a metal, conductive rubber, and other conductive material are also available for the wire. Moreover, even a pasted figuration by making the conductive rubber a sheet-form is available.

In addition, also for a change of a resin across years that occurs by adopting the fuel tank made of the resin indispensable for performing weight saving of a vehicle needed for an improvement of a fuel consumption, the embodiment enables not only the sealing performance to be improved by using the fastening member made of the resin but also the static electricity to be discharged with a simple structure since it has the electrically grounded member provided in the vicinity of the lid body 1.

Second Embodiment

Figure 3:
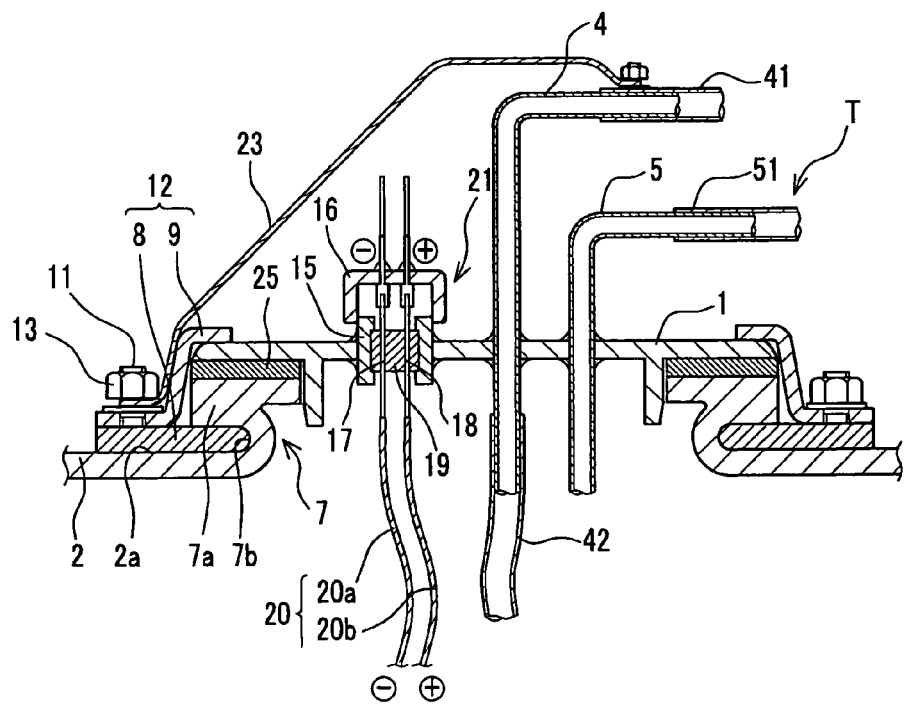
FIG. 3 shows a grounding structure of a fuel tank related to a second embodiment of the invention and is the enlarged a section view of the portion B shown in FIG. 1B.

FIG. 3 corresponds to the portion B shown in FIG. 1B and is an enlarged section view showing a main portion of a grounding structure of a fuel tank related to a second embodiment. A different point of the embodiment from the first embodiment is that in the embodiment a lead wire 23 is connected to a stud bolt 11 and nut 13 fastening a ring-shaped member 8 and retainer 9 and the lead wire 23 is connected to a conductive pipe 41, thereby grounding being performed. Meanwhile, in the embodiment same symbols are appended to the same elements as in the first embodiment and the descriptions thereof are omitted.

As shown in FIG. 3, a fuel tank T is, in a periphery of an opening 7, equipped with the ring-shaped member 8 made of metal fixed on a circumference of an opening 7, the retainer 9 made of metal fixing a lid body 1 on the ring-shaped member 8, a fuel supply piping 4 fixed through the lid body 1, a fuel return piping 5, and the conductive pipe 41 connected to the fuel supply piping 4.

In addition, the ring-shaped member 8 or retainer 9 is connected to the conductive pipe 41, which is connected to the fuel supply piping 4 fixed through the lid body 1, through the lead wire 23. Here the conductive pipe 41 is connected to a vehicle body (omitted from the drawing) and grounded. In addition, the fuel supply piping 4 and fuel return piping 5 are formed of a conductive metal. If the lead wire is electrically conductive, a metal, conductive rubber, and other conductive material are also available for the wire. Moreover, even a pasted figuration by making the conductive rubber a sheet-form is available.

The embodiment enables the accumulation of the static electricity to be prevented with a simple structure since the ring-shaped member 8 or retainer 9 is connected to the conductive pipe 41 through the lead wire 23 and thus grounding is performed. Thus by fastening the fastening members such as the stud bolt 11 and nut 13 and the lead wire 23 together and connecting them with a ground wire of an existing fuel pump 6 (see FIG. 1B), electrical charges charged on the members made of metal can be discharged.

Third Embodiment

Figure 4:
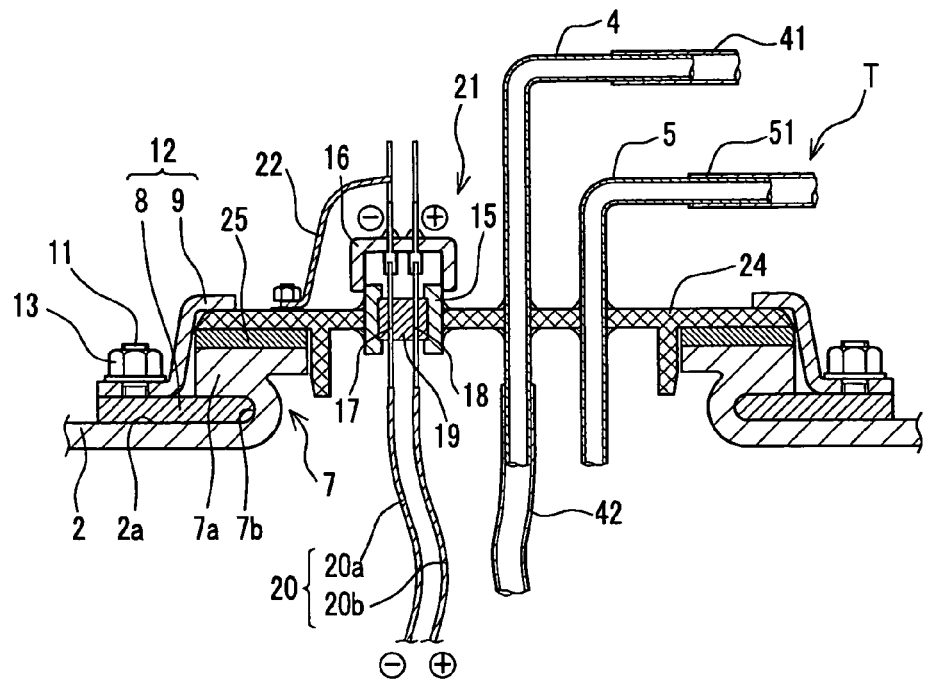
FIG. 4 shows a grounding structure of a fuel tank related to a third embodiment of the invention and is the enlarged section view of the portion B shown in FIG. 1B.

FIG. 4 corresponds to the portion B shown in FIG. 1B and is an enlarged section view showing a main portion of a grounding structure of a fuel tank related to a third embodiment. A different point of the embodiment from the first embodiment is that in the embodiment a lid body 24 is formed by carbon and the like being blended, thereby being conductive, and a lead wire 22 from an surface of the lid body 24 is connected to an electrode 17 (minus side) of a connector 21, thereby grounding is performed. Meanwhile, in the embodiment same symbols are appended to the same elements as in the first embodiment and the descriptions thereof are omitted.

As shown in FIG. 4, a fuel tank T is, in a periphery of an opening 7, equipped with a ring-shaped member 8 made of metal fixed on a circumference of the opening 7, a retainer 9 fixing the lid body 24 on the ring-shaped member 8, the conductive lid body 24 formed by carbon and the like being blended, and the electrode 17 of the minus side provided with the lid body 24.

In addition, the conductive lid body 24 and the electrode 17 of the minus side are connected through the lead wire 22. If the lead wire is electrically conductive, a metal, conductive rubber, and other conductive material are also available for the wire. Moreover, even a pasted figuration by the conductive rubber being made a sheet-form is available.

The embodiment enables the accumulation of the static electricity to be prevented with a simple structure since the lid body 24 and the electrode 17 of the minus side are connected through the lead wire 22 and thus grounding is performed.

Fourth Embodiment

Figure 5:
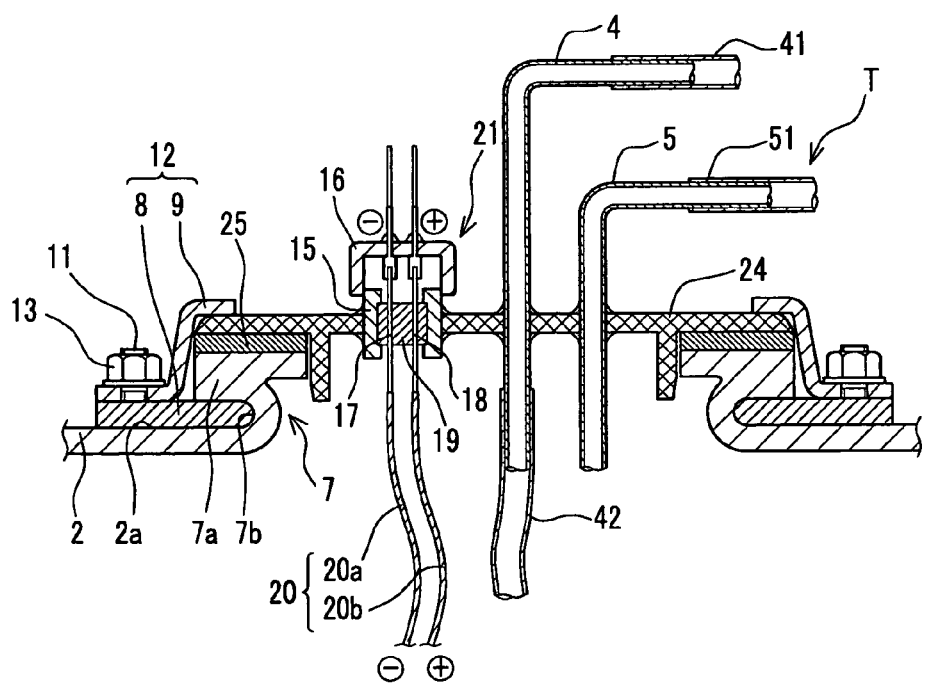
FIG. 5 shows a grounding structure of a fuel tank related to a fourth embodiment of the invention and is the enlarged section view of the portion B shown in FIG. 1B.
Figure 6:
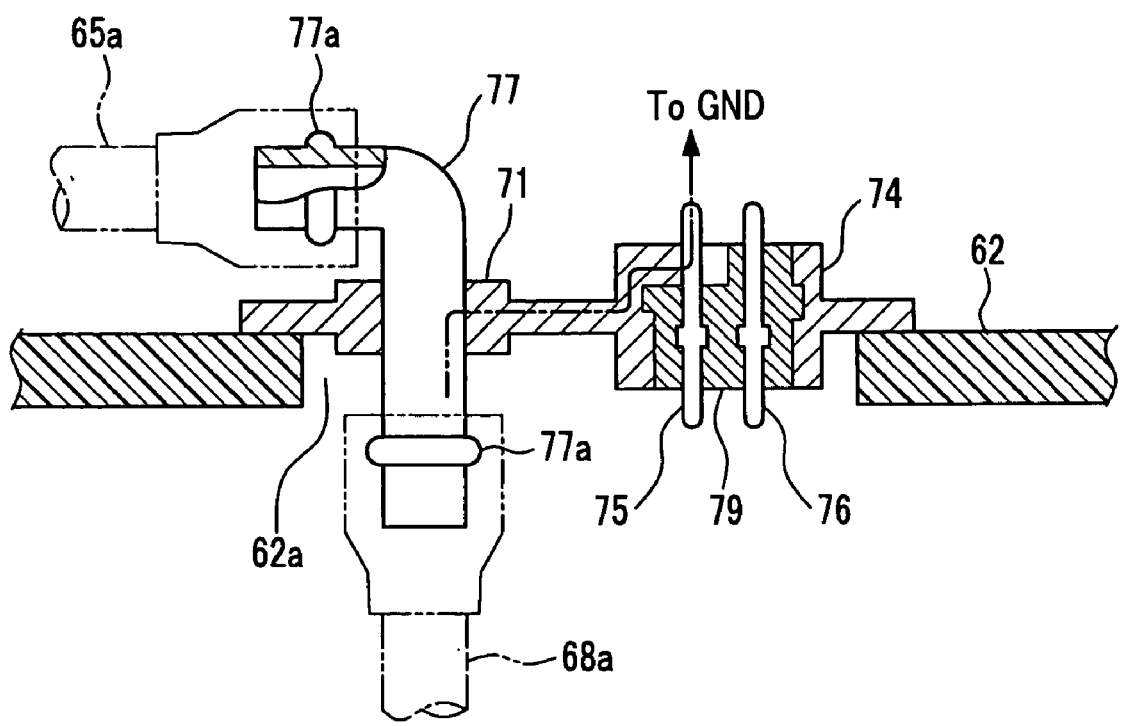
FIG. 6 shows a grounding structure of a fuel tank related to a conventional example and is an enlarged section view of a portion corresponding to the portion B shown in FIG. 1B.

FIG. 5 corresponds to the portion B shown in FIG. 1B and is an enlarged section view showing a main portion of a grounding structure of a fuel tank related to a fourth embodiment. A different point of the embodiment from the first embodiment is that in the embodiment a conductive lid body 24 and conductive pipe 41 are provided. Meanwhile, in the embodiment same symbols are appended to the same elements as in the first embodiment and the descriptions thereof are omitted.

As shown in FIG. 5, a fuel tank T is, in a periphery of an opening 7, equipped with a ring-shaped member 8 made of metal fixed on a circumference of the opening 7, a retainer 9 fixing the lid body 24 on the ring-shaped member 8, a fuel supply piping 4 fixed on the lid body 24, and the conductive pipe 41 connected to the fuel supply piping 4. Here the conductive pipe 41 is connected to a vehicle body (omitted from the drawing) and grounded. In addition, the fuel supply piping 4 and a fuel return piping 5 are formed of a conductive metal.

According to the embodiment, since the lid body 24 and pipe 41 are conductive, the ring-shaped member 8, retainer 9, lid body 24, fuel supply piping 4, and pipe 41 result in being electrically conducted, thereby the ring-shaped member 8 and retainer 9 being grounded. Thus, the accumulation of the static electricity can be prevented.

Thus, although the preferred embodiments are described, the present invention is not limited to the embodiments and they are changeable as needed within the range not deviated from the substances of the invention. For example, although the embodiments describe the examples that the lead wires for grounding are connected to the conductive pipes, grounding may be taken by being connected to electrically conductive fuel supply piping or fuel return piping. In addition, if the lead wires are electrically conductive, a metal, conductive rubber, and other conductive material are also available for the wires. Moreover, even a pasted figuration by making the conductive rubber a sheet-form is available. Still moreover, although the ring-shaped member and retainer are fixed with the fastening members, the retainer may be coupled to the ring-shaped member, and the lid body may be fixed using a cam lock mechanism. Still additionally, the lead wires or conductive members for grounding can be connected welded to the ring-shaped member or retainer.

What is claimed is:

1. A grounding structure of a fuel tank equipped with a lid body closing an opening of the fuel tank made of resin, the structure comprising:

a ring-shaped member made of metal fixed on the periphery of said opening; and a retainer made of metal fixing said lid body on said ring-shaped member;

wherein an electrically grounded member in the vicinity of said lid body is electrically connected to at least one of said ring-shaped member and said retainer, and grounding is performed through at least one of said ring-shaped member and said retainer.

2. The grounding structure of a fuel tank according to claim 1, wherein an outmost layer of the tank main body of said fuel tank is a conductive member and said tank main body is grounded.

3. The grounding structure of a fuel tank according to claim 1, wherein said electrically grounded member is a grounding member of a fuel pump housed in the tank main body of said fuel tank.

4. The grounding structure of a fuel tank according to claim 2, wherein said electrically grounded member is a grounding member of a fuel pump housed in said tank main body.

5. The grounding structure of a fuel tank according to claim 1, wherein said electrically grounded member is a conductive pipe electrically connected to a vehicle body.

6. The grounding structure of a fuel tank according to claim 2, wherein said electrically grounded member is a conductive pipe electrically connected to a vehicle body.

7. The grounding structure of a fuel tank according to claim 1, wherein said electrically grounded member is at least one of fuel supply piping and fuel return piping of a fuel pump housed in the tank main body of said fuel tank.

8. The grounding structure of a fuel tank according to claim 2, wherein said electrically grounded member is at least one of fuel supply piping and fuel return piping of a fuel pump housed in the tank main body of said fuel tank.

9. The grounding structure of a fuel tank according to claim 3, wherein said electrically grounded member is at least one of fuel supply piping and fuel return piping of said fuel pump.

10. The grounding structure of a fuel tank according to claim 4, wherein said electrically grounded member is at least one of fuel supply piping and fuel return piping of said fuel pump.

11. The grounding structure of a fuel tank according to claim 7, wherein at least one of said fuel supply piping and said fuel return piping is conductive piping.

12. The grounding structure of a fuel tank according to claim 8, wherein at least one of said fuel supply piping and said fuel return piping is conductive piping.

13. The grounding structure of a fuel tank according to claim 9, wherein at least one of said fuel supply piping and said fuel return piping is conductive piping.

14. The grounding structure of a fuel tank according to claim 10, wherein at least one of said fuel supply piping and said fuel return piping is conductive piping.

15. The grounding structure of a fuel tank according to any one of claims 1 to 14, wherein said lid body is conductive.

* * * * *